(12) United States Patent
Etterli

(10) Patent No.: US 10,919,197 B2
(45) Date of Patent: Feb. 16, 2021

(54) DEVICE FOR REINFORCING, SEALING OR INSULATING A STRUCTURAL ELEMENT

(71) Applicant: SIKA TECHNOLOGY AG, Baar (CH)

(72) Inventor: Heinz Etterli, Besenbüren (CH)

(73) Assignee: SIKA TECHNOLOGY AG, Baar (CH)

( * ) Notice: Subject to any disclaimer, the term of this patent is extended or adjusted under 35 U.S.C. 154(b) by 70 days.

(21) Appl. No.: 16/290,423

(22) Filed: Mar. 1, 2019

(65) Prior Publication Data

US 2019/0291312 A1 Sep. 26, 2019

(30) Foreign Application Priority Data

Mar. 23, 2018 (EP) .................................... 18163716

(51) Int. Cl.
*B29C 44/12* (2006.01)
*B62D 29/00* (2006.01)
(Continued)

(52) U.S. Cl.
CPC .......... *B29C 44/12* (2013.01); *B29C 65/4865* (2013.01); *B29C 65/542* (2013.01); *B29C 66/1122* (2013.01); *B29C 66/1312* (2013.01); *B60R 13/0861* (2013.01); *B62D 25/00* (2013.01); *B62D 29/002* (2013.01); *C09K 3/1021* (2013.01); *F16B 19/1081* (2013.01); (Continued)

(58) Field of Classification Search
CPC ... B29C 65/4865; B29C 44/12; B29C 65/542; B29C 66/1122; B29C 66/1312; B29C 66/727; B29C 66/742; B60R 13/0861; B60R 2013/0807; B62D 29/002; B62D 25/00; C09K 3/1021; F16B 19/1081; F16B 11/006; F16B 5/0664; B29K 2063/00; B29K 2075/00; B29K 2077/00; B29K 2105/048; B29K 2305/00; B29L 2031/30
USPC ........................................................ 296/181.6
See application file for complete search history.

(56) References Cited

U.S. PATENT DOCUMENTS 8,763,212 B2 * 7/2014 Scroggie ............... F16B 5/0628
24/297
2012/0073089 A1 * 3/2012 Buillas ................ B60R 13/0206
24/293

FOREIGN PATENT DOCUMENTS

CN 101469729 A 7/2009
DE 2736012 A1 2/1978
(Continued)

OTHER PUBLICATIONS

Sep. 13, 2018 Search Report issued in European Patent Application No. 18163716.6.

*Primary Examiner* — Joseph D. Pape
*Assistant Examiner* — Dana D Ivey
(74) *Attorney, Agent, or Firm* — Oliff PLC

(57) ABSTRACT

A device for reinforcing, sealing or insulating a structural element in a motor vehicle includes a support having a clip for pre-fixing the device in the structural element. The clip includes a base and two flexible wings arranged on the base. The device furthermore includes an adhesive for adhesively bonding the support in the structural element. The device furthermore includes an insertion element, which can be inserted in such a way into an interspace between the base and the wings of the clip when the device is pre-fixed on the structural element by the clip that the flexible wings are restricted in their freedom of movement.

20 Claims, 5 Drawing Sheets

(51) Int. Cl.
*B29C 65/54* (2006.01)
*B29C 65/48* (2006.01)
*B29C 65/00* (2006.01)
*B60R 13/08* (2006.01)
*C09K 3/10* (2006.01)
*F16B 19/10* (2006.01)
*B62D 25/00* (2006.01)
*B29K 63/00* (2006.01)
*B29K 75/00* (2006.01)
*B29K 77/00* (2006.01)
*B29K 105/04* (2006.01)
*B29K 305/00* (2006.01)
*B29L 31/30* (2006.01)
*F16B 11/00* (2006.01)
*F16B 5/06* (2006.01)

(52) U.S. Cl.
CPC .......... *B29C 66/727* (2013.01); *B29C 66/742* (2013.01); *B29K 2063/00* (2013.01); *B29K 2075/00* (2013.01); *B29K 2077/00* (2013.01); *B29K 2105/048* (2013.01); *B29K 2305/00* (2013.01); *B29L 2031/30* (2013.01); *B60R 2013/0807* (2013.01); *F16B 5/0664* (2013.01); *F16B 11/006* (2013.01)

(56) References Cited

FOREIGN PATENT DOCUMENTS

| | | | |
|---|---|---|---|
| JP | 2002-370247 A | | 12/2002 |
| JP | 2002370247 A | * | 12/2002 |
| WO | 01/83206 A1 | | 11/2001 |

* cited by examiner

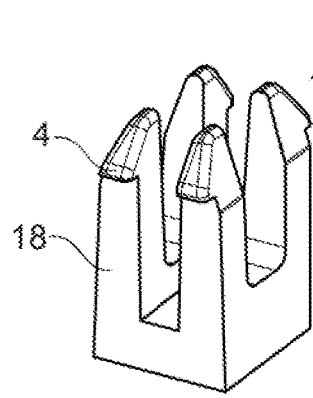
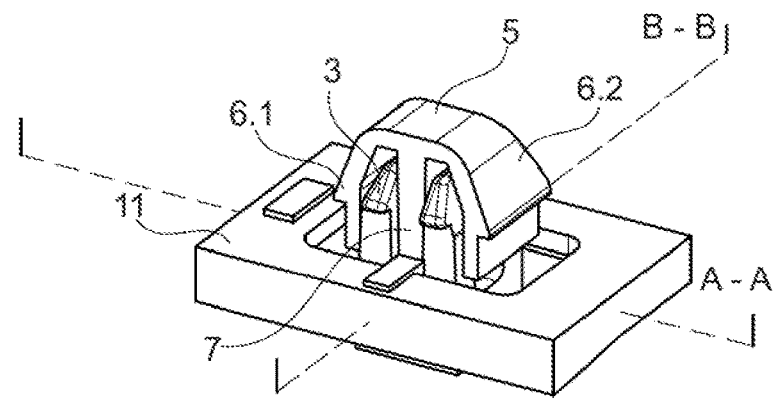
Fig. 4a
Fig. 4b
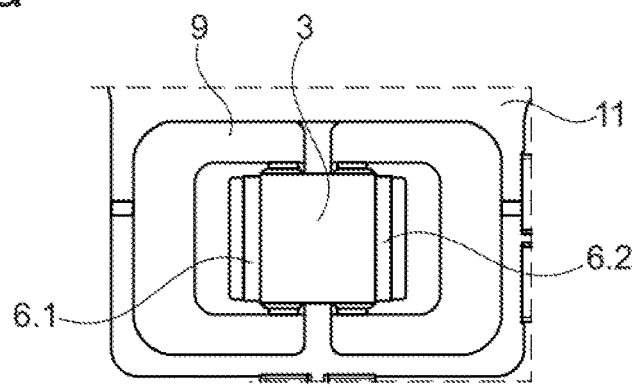
Fig. 4c
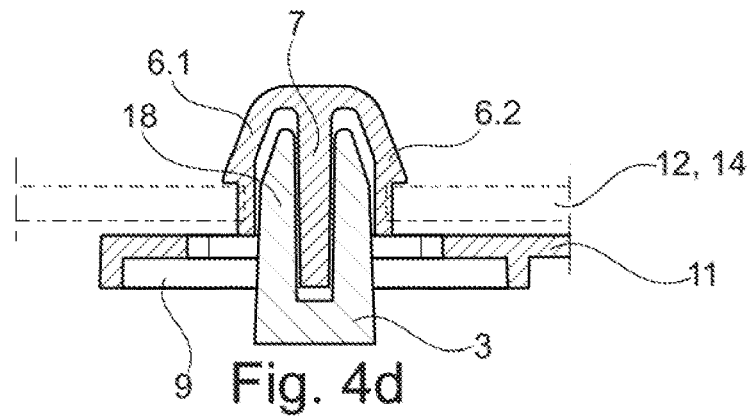
Fig. 4d
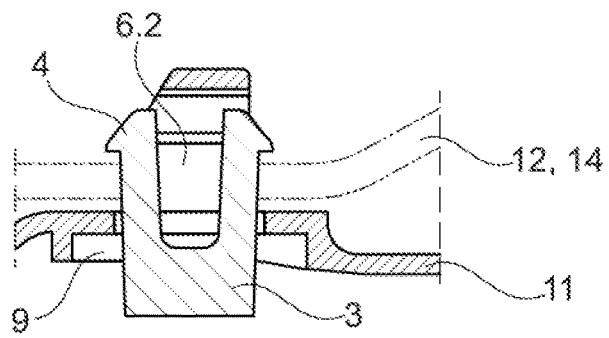
Fig. 4e

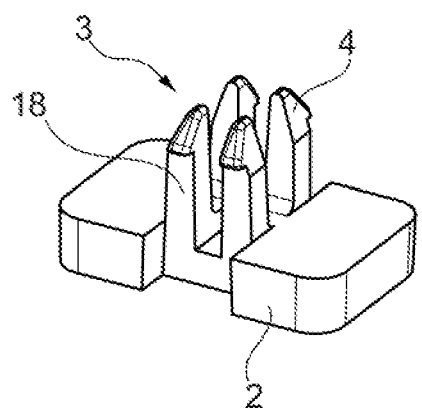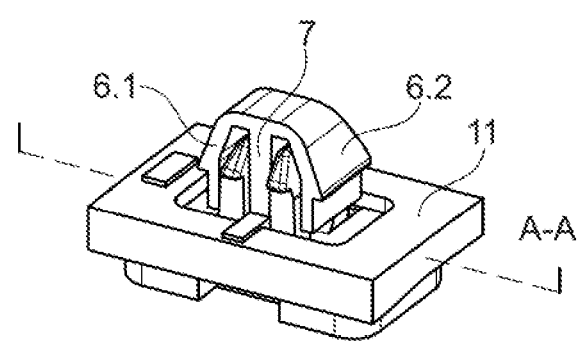
Fig. 5a  Fig. 5b
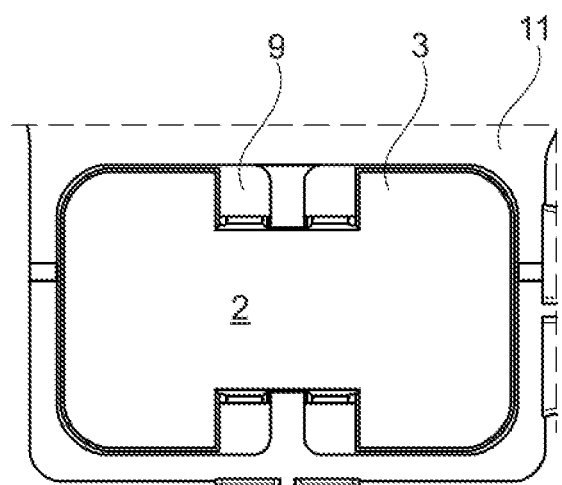
Fig. 5c
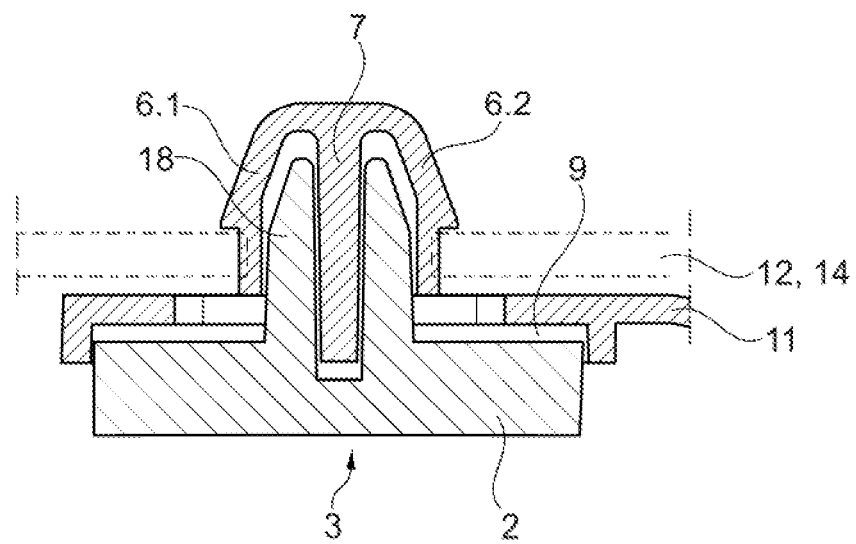
Fig. 5d

DEVICE FOR REINFORCING, SEALING OR INSULATING A STRUCTURAL ELEMENT

The invention relates to a device for reinforcing, sealing or insulating a structural element with a support and an adhesive. It furthermore relates to a system having a structural element and a device arranged therein for reinforcing, sealing or insulating the structural element.

In many cases, component elements such as bodies and/or chassis of means of transfer and transport, in particular water or land vehicles or aircraft, have structures with cavities in order to allow lightweight designs. However, these cavities cause a wide variety of problems. Depending on the type of cavity, it must be sealed to prevent the ingress of moisture and dirt, which can lead to corrosion of the component elements. It is often also desirable to significantly reinforce the cavities and thus the component element but to retain the low weight. It is often also necessary to stabilize the cavities and thus the component elements in order to reduce noise, which would otherwise be transmitted along the cavity and through the latter. Many of these cavities have an irregular shape or restricted dimensions, making it more difficult to seal, reinforce and insulate them correctly.

Particularly in motor vehicle construction but also in aircraft and ship construction, sealing elements (baffles) are therefore used to seal and/or acoustically compartmentalize cavities, or reinforcing elements (reinforcers) are used to reinforce cavities.

A body of a motor vehicle is depicted schematically in FIG. 1. Here, the body 10 has various structures with cavities, e.g. pillars 14 and supports or braces 12. Such structural elements 12, 14 with cavities are usually sealed or reinforced with sealing and/or reinforcing elements 16.

FIGS. 2a and 2b show schematically a known concept for the sealing and/or reinforcing closure of openings or cavities in a motor vehicle. In this case, FIG. 2a shows a device 16 before expansion of an expandable material 13. FIG. 2b shows the same device 16 as part of the system 1 but after expansion of the expandable material 13, i.e. with the expanded material 13'.

The device 16 is situated in a cavity of a body structure of the kind depicted in FIG. 1, for example. A section of such a structural element 12, 14 of a body is depicted schematically in FIGS. 2a and 2b. The device 16 comprises a support 11, which has an edge region 21. Here, the expandable material 13 is arranged substantially on this edge region 21 of the support 11.

Before expansion of the expandable material 13, there is a gap between the device 16 and the structural element 12, 14. This gap makes it possible to coat the structural element 12, 14 in order to achieve corrosion protection of the structural element 12, 14. After this coating, the expandable material 13 is usually expanded by the action of heat, wherein the expanded material 13' thereby closes the gap between the device 16 and the structural element 12, 14. Moreover, fixing of the device 16' in the structural element 12, 14 is simultaneously also achieved by the expansion of the expandable material 13. A device 16' secured in this way in the structural element 12, 14 on the one hand reinforces the structural element 12, 14 and on the other hand closes the cavity in the structural element 12, 14.

Such devices 16 depicted in FIGS. 2a and 2b are generally pre-fixed on the structural elements 12, 14 by clips. This pre-fixing serves to hold the device 16 at the desired point in the body 10 before the support 11 of the device 16 is finally secured in the structural element 12, 14 with adhesive 13. Such pre-fixing by clips also makes it possible to coat the structural element 12, 14 with a dip coating without the pre-fixed device 16 being flushed away during this process.

A typical embodiment of such pre-fixing is depicted in FIGS. 3a to 3c. In particular, clips 5 which can be hooked into corresponding openings in the structural elements 12, 14 are used for pre-fixing the device 16.

A clip 5 of this kind is shown schematically in a perspective view in FIG. 3a. In this case, the clip 5 has a base 7 and two flexible wings 6.1, 6.2 arranged on this base 7.

These wings 6.1, 6.2 have hook-shaped elements, which are provided for the purpose of latching in on the corresponding edges of the openings in the structural elements 12, 14.

A section of a pre-fixed device 16 on a structural element 12, 14 is depicted in FIG. 3b. Here, the device 16 is shown from below. Thus, only the base 7 of the clip and the two ends of the flexible wings 6.1, 6.2 are visible. The wings 6.1, 6.2 are hooked in on the corresponding edges of the structural element 12, 14.

In the case of certain devices 16, such clips 5 for pre-fixing are problematic, however, especially when a relatively large force acts on the clip 5 during the pre-fixing of the device 16 in the structural element 12, 14. For example, there are situations in which the pre-fixing of the clip 5 on the structural element 12, 14 is exposed to a rotary force. This occurs especially when the device 16 is pre-fixed on the structural element 12, 14 with just one clip and when the device tends to be of large and heavy design. This can have the effect that the device 16 cannot be held or pre-fixed at the desired position and, in extreme cases, the pre-fixing between the device 16 and the structural element 12, 14 may come undone. FIG. 3c depicts, by way of example, such a situation, in which the clip 5 is twisted relative to the structural element 12, 14.

It is therefore the underlying object of the invention to make available an improved device for reinforcing, sealing or insulating a structural element, which does not have the abovementioned disadvantages. In particular, the intention is to improve the device in respect of the pre-fixing in the structural element, thus making it possible to ensure that the device is pre-fixed at the desired position in the structural element until an adhesive connects the support definitively to the structural element.

This object is achieved by a device for reinforcing, sealing or insulating a structural element in a motor vehicle, comprising: a support having a clip for pre-fixing the device in the structural element, wherein the clip has a base and two flexible wings arranged on the base; an adhesive for adhesively bonding the support in the structural element; and an insertion element, which can be inserted in such a way into an interspace between the base and the wings of the clip when the device is pre-fixed on the structural element by the clip that the flexible wings are restricted in their freedom of movement.

This solution has the advantage that a pre-fixing can be significantly stabilized and improved in a simple and low-cost manner by means of a simple, low-cost element, namely the insertion element. The provision of an insertion element of this kind makes it possible to reliably fix in the structural element devices which need only be pre-fixed to the structural element by one clip. It is thus not essential in all cases to provide pre-fixing elements, such as further clips or welding lugs or the like, on the devices.

One core concept of the present invention is that it is possible effectively to prevent twisting, displacement or detachment of the clip on the structural element by restricting freedom of movement of the flexible wings of the clip.

In particular, it is advantageous here that no further adaptations have to be made to existing systems. It is sufficient to provide a simple and low-cost additional element, namely the insertion element, to significantly improve the pre-fixing of the device in the structural element.

In one illustrative embodiment, the insertion element is connected to the support by a flexible web.

This has the advantage that the support and the insertion element are always together as a result. Thus, logistics or handling of the overall system are simplified, and incorrect handling (e.g. use of non-matching insertion elements and supports) is prevented in an effective manner.

In one illustrative development, the flexible web is used to arrange the insertion element on the support in a region of the clip.

Such an arrangement offers the advantage that the insertion element is precisely at the point envisaged, namely in the vicinity of the clip. Handling of the overall system is thus simplified.

In one illustrative embodiment, the insertion element and the support are formed integrally.

This has the advantage that the support and the insertion element can be produced jointly in one work step, e.g. in an injection moulding process.

In one illustrative embodiment, the insertion element and the support are formed from the same material.

This once again has the advantage that the insertion element and the support can be produced jointly in one operation, e.g. by an injection moulding process.

In one illustrative embodiment, the flexible web is longer than a height of the insertion element.

This has the advantage that handling of the insertion element is simplified since the flexible web leaves sufficient freedom to introduce the insertion element into the clip in an appropriate manner.

In an alternative illustrative embodiment, the insertion element and the support are designed as separate elements.

In one illustrative development, the support and the insertion element are not formed from the same material.

Such a separate arrangement of the insertion element and the support has the advantage that, on the one hand, it is possible to use a simple injection mould to produce these parts and that, on the other hand, different materials can be used, which can be optimized in respect of a function of the respective elements. For example, it is possible in this case for the support and the clip formed thereon to be formed from a more flexible material and for the insertion element to be produced from a less flexible material.

In one illustrative embodiment, the support has a pocket-shaped depression in a region of the clip, wherein the insertion element has a foot, which engages in this pocket-shaped depression when the insertion element is introduced into the clip.

Providing such a depression in the support and such a foot on the insertion element, which engage in one another in a state of use, has the advantage that a freedom of movement of the flexible wings of the clip is thereby further restricted or that the pre-fixing between the device and the structural element can thereby be further stabilized and improved because the insertion element can thereby be anchored better on the support. Thus, the insertion element and, as a result, the overall pre-fixing can be better protected against twisting or displacement.

In one illustrative development, the foot is designed in such a way that it substantially fills the depression when the insertion element is introduced into the clip.

This has the advantage that particularly stable anchoring of the insertion element on the support can thereby be achieved.

In one illustrative embodiment, the insertion element can be connected by positive engagement to the support and/or to the structural element.

In one illustrative development, the insertion element has one or more hooks, which can be latched in on the support and/or on the structural element.

Such a connection between the insertion element and the support or the structural element by positive engagement has the advantage that a reliable mechanical connection, which protects the insertion element from falling out, is thereby created. Moreover, this has the advantage that the user can detect from a clicking noise, for example, during handling whether or not the insertion element has been inserted in the envisaged position in the clip.

In an alternative embodiment, the insertion element can be connected by non-positive engagement to the support and/or to the structural element.

In one illustrative development, the insertion element and the clip are in this case designed in such a way that they engage in one another in a wedge-like manner when the insertion element is introduced into the clip.

Such a connection between the insertion element and the support or the structural element by means of non-positive engagement has the advantage that the corresponding elements can be produced with greater tolerances than is the case with positive engagement. It is thereby possible, in particular, to use less expensive insertion elements.

In one illustrative embodiment, the insertion element has connecting elements, which are operatively connected to the structural element and/or to the support when the insertion element is introduced into the clip.

In a first illustrative development, the insertion element has connecting elements, which are operatively connected to the structural element only when the insertion element is introduced into the clip. In this case, the connecting elements can be designed as hooks or wedge-shaped sections, for example.

An operative connection of this kind between the insertion element and the structural element has the advantage that, as a result, not only the support but also the insertion element is pre-fixed directly on the structural element. Thus, it is possible to achieve better protection against the device falling off the structural element.

In a second alternative development, the insertion element has connecting elements, which are operatively connected to the support only when the insertion element is introduced into the clip. Once again, the connecting elements can be configured as hooks, wedge-shaped element sections or elements of some other kind, for example.

An operative connection of this kind between the insertion element and the support has the advantage that, as a result, the insertion element can be designed independently of the configuration of the structural element. This means that a single insertion element can be used for structural elements of different thicknesses, for example.

In one illustrative embodiment, the support has just one clip for pre-fixing the device in the structural element.

In one illustrative embodiment, the adhesive is arranged on the support. In this case, the support and the adhesive are pre-fixed jointly on the structural element by means of the clip.

In one illustrative development, the adhesive is arranged on the support by an injection moulding method. In particular, a two-component injection moulding method can be used to produce the support and the adhesive.

In an alternative illustrative embodiment, the support is pre-fixed on the structural element without an adhesive, and the adhesive is introduced separately into the structural element.

In another alternative embodiment, the adhesive is applied to the structural element or to the support. In this case, the adhesive can be extruded onto the support or the structural element, for example.

In one illustrative embodiment, the adhesive is designed as a non-expandable adhesive.

In the context of this invention, the term non-expandable is used to denote an adhesive which increases or decreases in volume by at most 5% of its original volume as it cures.

In one illustrative embodiment, the adhesive is designed as an expandable adhesive.

In one illustrative embodiment, the expandable adhesive forms a single coherent element. In an alternative embodiment, a plurality of expandable adhesives which are not connected forms a plurality of elements which are not connected.

In one illustrative embodiment, the expandable adhesive has an expansion rate of 300 to 3000%. In one illustrative development, the expandable adhesive has an expansion rate of from 1000 to 2700% or between 1500 and 2500%.

An example of a material with such an expansion rate can be obtained under the trade name SikaBaffle® 450.

In an alternative embodiment, the expandable adhesive has an expansion rate of 50 to 500%. In one illustrative embodiment, the expandable adhesive has an expansion rate of from 70 to 400% or between 100 and 300%.

An example of a material with such an expansion rate can be obtained under the trade name SikaReinforcer® 911.

The support can consist of various materials. Preferred materials are plastics, especially polyurethanes, polyamides, polyesters and polyolefins, preferably polymers resistant to high temperatures, such as poly(phenylene ether), polysulphones or polyether sulphones. As a particular preference, polyamides, in particular nylon 6, nylon 6.6, nylon 11, nylon 12 or a blend thereof, are used. Combinations with fibres, e.g. glass fibres or carbon fibres, are also possible.

The support can furthermore be of any desired construction and any desired structure. For example, it can be solid, hollow or foamed or can have a grid-type structure. The surface of the support can typically be smooth, rough or structured.

In one illustrative embodiment, the support is produced by an injection moulding method.

In one illustrative embodiment, the support comprises a plastic, in particular a polyamide.

The object stated at the outset is furthermore achieved by a system of a reinforced, sealed or insulated structural element in a motor vehicle, the system comprising: a structural element; and a device according to the above description, wherein the device is fastened on the structural element by the clip, and wherein the insertion element is arranged at least partially in the interspace between the base and the wings of the clip, with the result that the flexible wings are restricted in their freedom of movement.

In one illustrative embodiment, the adhesive is in this case designed as an expandable material.

Details and advantages of the invention are described below by means of illustrative embodiments and with reference to schematic drawings. In the drawings:

FIGS. 4a to 4e show a schematic depiction of an illustrative pre-fixing of a device in a structural element;

FIGS. 5a to 5d show a schematic depiction of an illustrative pre-fixing of a device in a structural element;

Figure 1:
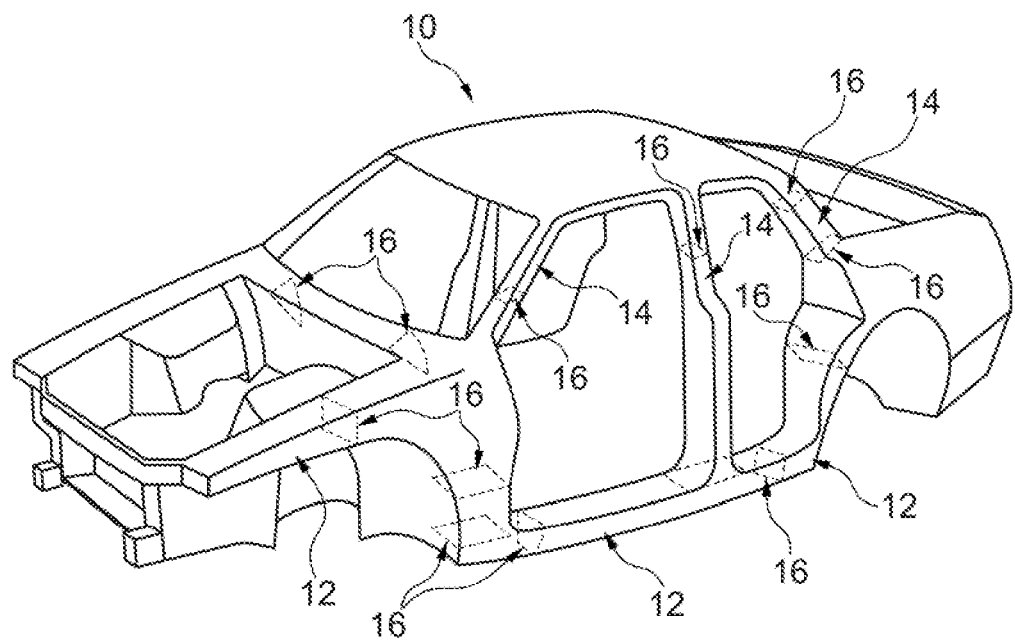
FIG. 1 shows an illustrative depiction of a body in accordance with the prior art.
Figure 2A:
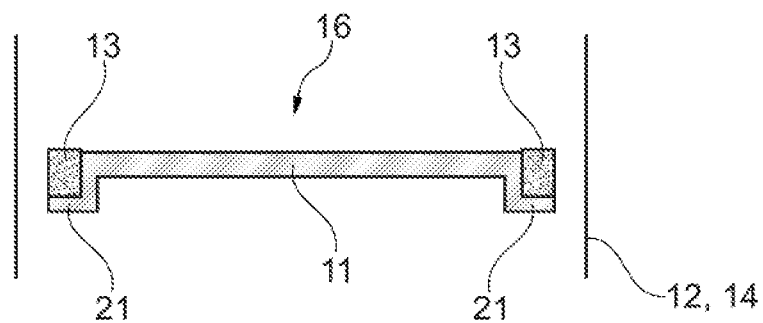
FIGS. 2a and 2b show a schematic depiction of an illustrative device in accordance with the prior art.
Figure 2B:
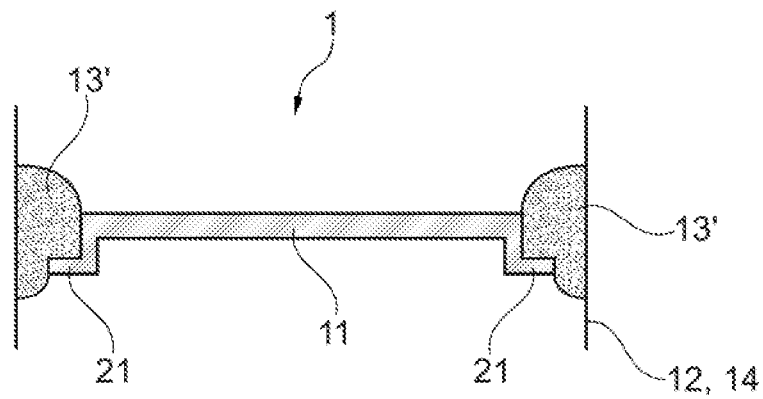
Figure 3A:
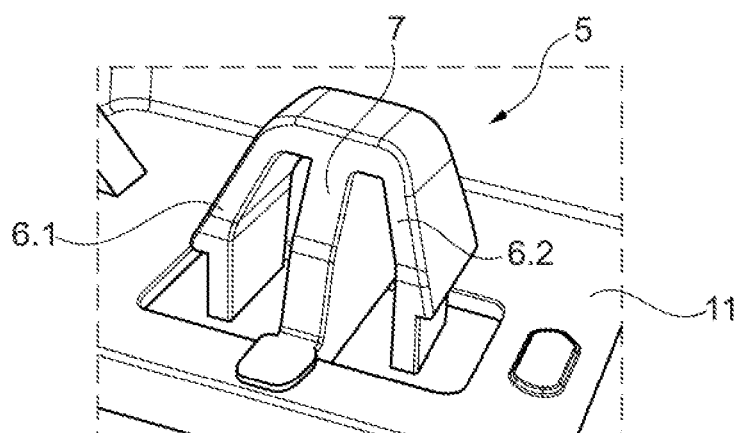
FIGS. 3a to 3c show a schematic depiction of an illustrative pre-fixing of a device in a structural element in accordance with the prior art.
Figure 3B:
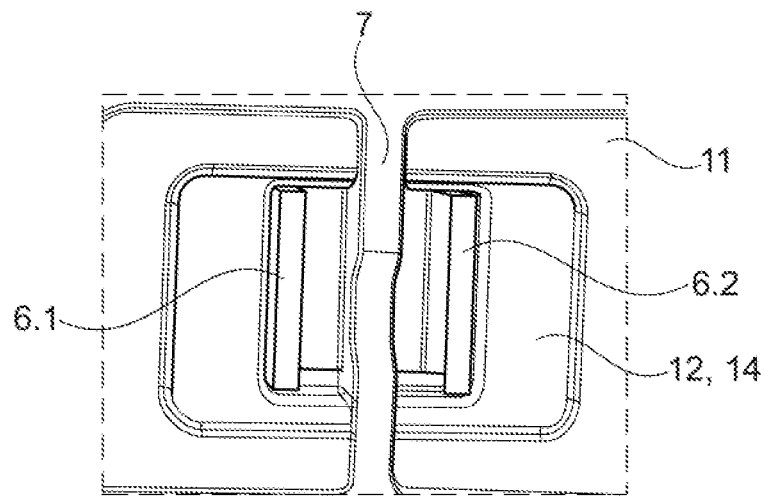
Figure 3C:
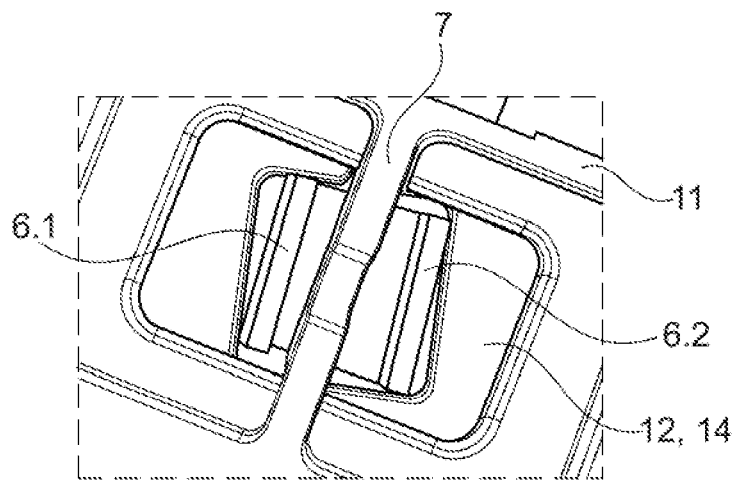

FIGS. 4a to 4e show a first variant of an illustrative pre-fixing of a device in a structural element. Here, FIG. 4a shows an illustrative insertion element 3 in a perspective view. FIG. 4b shows the illustrative insertion element 3 as it is arranged in the clip 5 of the support 11, likewise in a perspective view. FIG. 4c shows a view from below of the pre-fixing shown in FIG. 4b. FIG. 4d shows a cross section of the schematic pre-fixing along a section plane A-A in FIG. 4b, and FIG. 4e shows a cross section along a section plane B-B in the pre-fixing shown in FIG. 4b.

The insertion element 3 shown in FIG. 4a has four arm-type extensions, which each form a hook 4 at one end. The arm-type extensions are designed as wedge-shaped elements 18. In this case, the four extensions are connected to one another by a common base.

In FIG. 4b, the insertion element 3 from FIG. 4a has been inserted into a clip 5. Here, it can be seen that the arms of the insertion element 3 fill the intermediate region between the base 7 and the flexible wings 6.1, 6.2 of the clip 5 in such a way that a freedom of movement of said flexible wings 6.1, 6.2 is restricted. In this illustrative embodiment, the hooks 4 of the insertion element 3 are provided to enter into a positive engagement with the structural element 12, 14 in a state of use. This can be seen from the cross section shown in FIG. 4e along section line B-B.

In FIG. 4c, the perspective view shown in FIG. 4b is depicted in a view from below.

FIG. 4d depicts a cross section along the line A-A in FIG. 4b. Here, it can be seen how the wedge-shaped elements 18 of the arm-type extensions of the insertion element 3 restrict freedom of movement of the flexible wings 6.1, 6.2 of the clip 5 in that the extensions of the insertion element 3 fill intermediate regions between the base 7 and the flexible wings 6.1, 6.2 of the clip 5.

FIGS. 5a to 5d depict a second variant of a pre-fixing of the device on a structural element schematically and by way of example. Here, FIG. 5a shows a second variant of an insertion element 3, FIG. 5b shows an insertion element 3 of this kind inserted in a clip 5, FIG. 5c shows a view from below with the pre-fixing shown in FIG. 5b, and FIG. 5d shows a cross section of the pre-fixing shown in FIG. 5b along section plane A-A.

In this illustrative embodiment, the insertion element 3 once again has four arm-type extensions, which each form a hook 4 at one end and which once again form a wedge-shaped section 18. In contrast to the embodiment shown in FIG. 4a, the insertion element 3 in this illustrative embodiment has a foot 2. Here, this foot 2 is dimensioned in such a way that it engages in a corresponding pocket-type depression 9 of the support 11 when the insertion element 3 is inserted into the clip 5.

This inter-engagement of the foot 2 and the pocket-shaped depression 9 of the support 11 is readily visible particularly from the cross-sectional depiction in FIG. 5d. By means of this inter-engagement, the insertion element 3 is anchored more effectively on the support 11, thereby making it possible to improve overall stability of the pre-fixing.

Figure 6A:
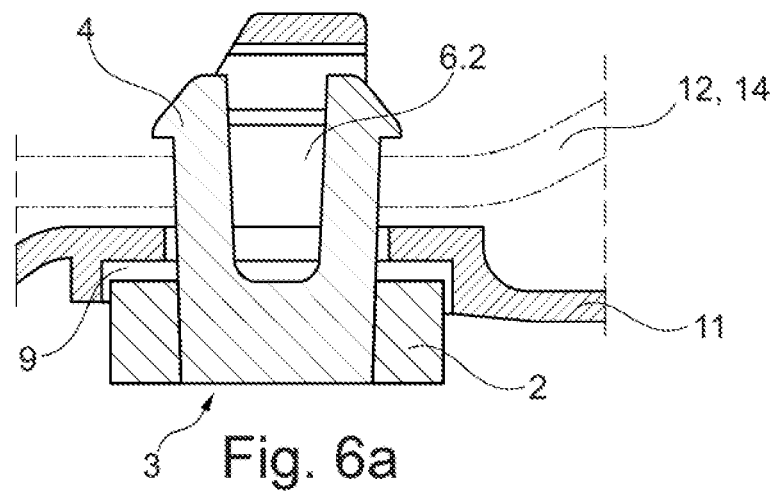
FIGS. 6a and 6b show a schematic depiction of an illustrative pre-fixing of a device in a structural element.
Figure 6B:
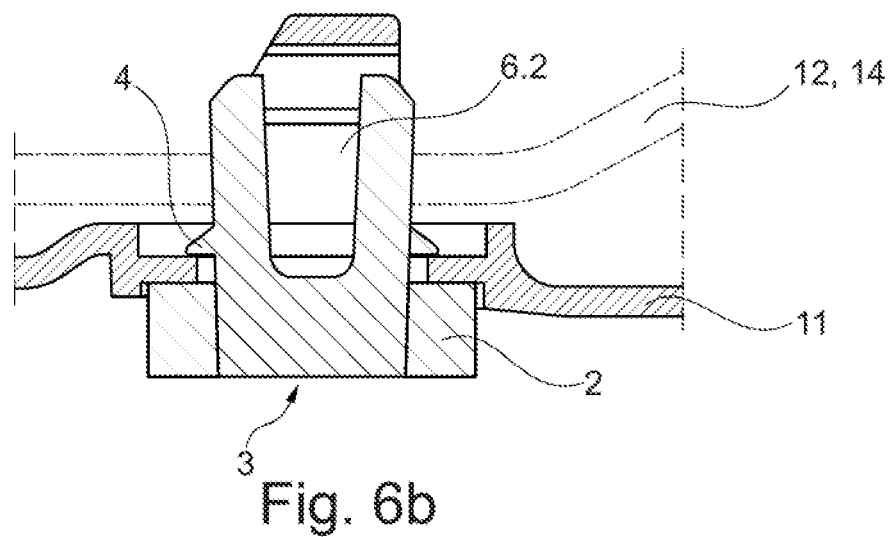

Two different variants of the anchoring of the insertion element 3 are depicted in FIGS. 6a and 6b.

In FIG. 6a, the insertion element 3 is anchored directly on the structural element 12, 14. Here, the hooks 4 latch in on the corresponding edges of the structural element 12, 14 when the insertion element 3 is inserted fully into the clip 5.

In FIG. 6b, in contrast, the insertion element 3 is anchored on the support 11. Here, the hooks 4 on the insertion element 3 are arranged lower down on the arm-type extensions, with the result that they latch in on edges provided for that purpose on the support 11 when the insertion element 3 is inserted fully into the clip 5.

Figure 7:
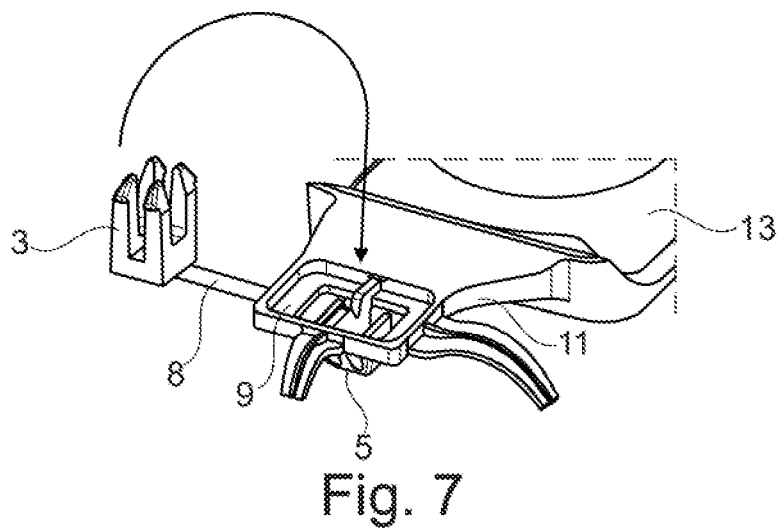
FIG. 7 shows a schematic perspective depiction of an illustrative support with an insertion element.

A section of an illustrative device is depicted in FIG. 7, wherein the insertion element 3 is connected to the support 11 by means of a web 8. Here, the flexible web 8 is arranged in a region of the clip 5 on the support 11. In this illustrative embodiment, an adhesive 13 is arranged on the support 11. After the clip 5 has latched into the structural element (not depicted in this figure), the insertion element 3 is folded over the flexible web 8 and inserted between the wings and the base of the clip 5.

LIST OF REFERENCE SIGNS 1 system
2 foot
3 insertion element
4 hook
5 clip
6.1 first wing
6.2 second wing
7 base
8 web
9 depression
10 body
11 support
12 structural element
13 expandable material
13' expanded material
14 structural element
16 device
18 wedge-shaped element
21 edge region

The invention claimed is:

1. A device for reinforcing, sealing or insulating a structural element in a motor vehicle, comprising:
    a support having (i) a clip for pre-fixing the device in the structural element, wherein the clip comprises a base and two flexible wings arranged on the base; and (ii) a pocket-shaped depression in a region of the clip;
    an adhesive for adhesively bonding the support in the structural element; and
    element that is configured to be inserted into an interspace between the base and the wings of the clip so that when the device is pre-fixed on the structural element by the clip the flexible wings are restricted in their freedom of movement, and the insertion element comprising a foot that engages in the pocket-shaped depression once the insertion element is inserted into the clip.

2. The device according to claim 1, wherein the insertion element is connected to the support by a flexible web.

3. The device according to claim 2, wherein the insertion element and the support are formed integrally and/or from the same material.

4. The device according to claim 2, wherein the flexible web is longer than a height of the insertion element.

5. The device according to claim 1, wherein the support and the insertion element are designed as separate elements, and/or wherein the support and the insertion element are not formed from the same material.

6. The device according to claim 1, wherein the foot is designed in such a way that it substantially fills the depression when the insertion element is inserted into the clip.

7. The device according to claim 1, wherein the insertion element can be connected by positive engagement to the support and/or to the structural element.

8. The device according to claim 7, wherein the insertion element has one or more hooks, which can be latched in on the support and/or on the structural element.

9. The device according to claim 1, wherein the insertion element can be connected by non-positive engagement to the support and/or to the structural element.

10. The device according to claim 9, wherein the insertion element and the clip are designed in such a way that they engage in one another in a wedge-like manner when the insertion element is inserted into the clip.

11. The device according to claim 1, wherein the insertion element has connecting elements, which are operatively connected to the structural element and/or to the support when the insertion element is inserted into the clip.

12. The device according to claim 1, wherein the support has just one clip for pre-fixing the device in the structural element.

13. A system of a reinforced, sealed or insulated structural element in a motor vehicle, the system comprising:
    the structural element; and
    the device according to claim 1, wherein the device is fastened on the structural element by the clip, and wherein the insertion element is arranged at least partially in the interspace between the base and the wings of the clip, with the result that the flexible wings are restricted in their freedom of movement.

14. The system according to claim 13, wherein the adhesive is expandable.

15. The device according to claim 1, wherein, when the foot engages in the pocket-shaped depression, at least a portion of the foot fits within the pocket-shaped depression.

16. The device according to claim 1, wherein the support comprises an aperture, and the clip is arranged at the aperture so that the insertion element is inserted into the clip by passing at least a portion of the insertion element through the aperture.

17. The device according to claim 16, wherein the aperture is located in the pocket-shaped depression.

18. The device according to claim 17, wherein, when the foot engages in the pocket-shaped depression, the foot abuts a surface of the pocket-shaped depression adjacent the aperture.

19. The device according to claim 1, wherein the pocket-shaped depression is located on an opposite side of the support as the wings of the clip.

20. The device according to claim 1, wherein, once the insertion element is inserted into the clip, the insertion element and the support engage with each other so that the insertion element mechanically interlocks with the support.

* * * * *